United States Patent [19]

Kamiya

[11] Patent Number: 4,635,115
[45] Date of Patent: Jan. 6, 1987

[54] SYNCHRONOUS SEPARATION CIRCUIT
[75] Inventor: Kiyoshi Kamiya, Tokorozawa, Japan
[73] Assignee: Citizen Watch Co., Ltd., Tokyo, Japan
[21] Appl. No.: 667,801
[22] Filed: Nov. 2, 1984
[30] Foreign Application Priority Data Nov. 4, 1983 [JP] Japan .............................. 58-207274

[51] Int. Cl.⁴ .............................................. H04N 5/08
[52] U.S. Cl. .................................................... 358/153
[58] Field of Search ........................ 358/153, 154, 148
[56] References Cited

FOREIGN PATENT DOCUMENTS 60880 4/1983 Japan ................................... 358/153
186270 10/1983 Japan ................................... 358/153

Primary Examiner—Tommy P. Chin
Attorney, Agent, or Firm—Sherman and Shalloway

[57] ABSTRACT

A synchronous separation circuit comprises a capacitor, one end of the capacitor serving as an input terminal for receiving a synthetic video signal, a first C-MOS inverter, an input terminal of which is connected to the other end of the capacitor, a first resistor, one end of which is connected to the other end of the capacitor, a diode, one end of which is connected to the other end of the capacitor, and a second C-MOS inverter, an input terminal of which is connected to the other end of the diode, while an output terminal of which is connected directly or through a second resistor to the input terminal of the second C-MOS inverter, wherein when the synthetic video signal has positive characteristics, a potential at the other end of the first resistor is set to a value equal to or lower than a potential at the input terminal of the second C-MOS inverter, and when the synthetic video signal has negative characteristics, the potential at the other end of the first resistor is set to a value equal to or higher than the potential at the input terminal of the second C-MOS inverter, so as to provide a direct current bias voltage.

5 Claims, 10 Drawing Figures

SYNCHRONOUS SEPARATION CIRCUIT

BACKGROUND OF THE INVENTION

1. Field of the Invention

This invention relates to a synchronous signal separation circuit for a television set and the like, and more particularly to a synchronous separation circuit incorporating C-MOS inverters as an active element.

2. Description of the Prior Art

Recently, it has been able to make a television set compact and even a portable liquid crystal television has been developed. A conventional television set using a CRT has incorporated a bipolar transistor as an active element in a synchronous separation circuit.

However, in a compact and portable electronic equipment such as a portable liquid crystal television and the like which deals with information, it is preferable to use a C-MOS LSI for processing information, so as to make parts compact and reduce the number of parts as well as reduce current consumption, wherein a synchronous signal is extracted from a synthetic video signal, which is an analog signal, by a C-MOS circuit to digitize the signal. To this end, there has arisen necessity of similarly making a synchronous separation circuit of C-MOS. In such a circumstance as above, the present invention relates to an improvement of the synchronous separation circuit with C-MOS inverters.

FIGS. 1 and 2 show a conventional synchronous separation circuit using a C-MOS inverter. Namely, FIG. 1 shows an example of a synchronous separation circuit using a C-MOS inverter as an active element. FIG. 2A shows a waveform at an input terminal of the C-MOS inverter upn receiving a synthetic video signal. FIG. 2B shows a graph of an outputted synchronous signal. In FIG. 1, C1 designates a capacitor of about 0.1 $\mu$F for blocking direct current relative to a synthetic video signal; I1 a C-MOS inverter for amplifying a synchronous signal in the synthetic video signal; R1 a resistor of about 5 M$\Omega$; R2 a resistor of about 1 M$\Omega$; R3 a resistor of about 10 K$\Omega$; C2 a smoothing capacitor of about 100 pF; and D1 a diode.

In FIG. 2A, an axis of ordinates indicates a potential wherein a reference voltage VF is a change-over potential of the C-MOS inverter, while an axis of abscissas corresponds to a time. The graph shows a waveform of an input to the C-MOS inverter, that is, a waveform of the sum of the synthetic video signal and a d.c. bias voltage given by the resistors R1 to R3, capacitors C1 to C2, and diode D1.

FIG. 2B shows a waveform of an output when the synthetic video signal is inputted to the circuit of FIG. 1, wherein an axis of abscissas corresponds to a time, which is in accordance with the axis of abscissas of FIG. 2A. The resistor R1 serves to equalize a potential at an input terminal of the C-MOS inverter to a potential at an output terminal thereof, while a circuit constituted of the resistors R2 and R3, capacitor C1 and diode D1 serves to lower a potential at the input terminal of the C-MOS inverter than a potential at the output terminal thereof by almost an amount of voltage drop of the diode D1. When the synthetic video signal is inputted to the circuit of FIG. 1, the above-mentioned two functions reach equilibrium, and as shown in FIG. 2A, a lowermost potential VL1 of the synchronous signal in the synthetic video signals is fixed at such a position as to be lowered from the change-over potential VF of the C-MOS inverter I1 to substantially half amount of the voltage drop of the diode. As a result, the synchronous separation signal as shown in FIG. 2B is obtained.

However, according to the circuit as shown in FIG. 1, an output voltage of the C-MOS inverter I1 is always varied, and therefore it is necessary to make a circuit having a long time constant so as to obtain a stable d.c. bias. To meet the requirements, it is obliged to enlarge a capacitance of the d.c. blocking capacitor C1. Accordingly, a volume of the capacitor C1 must be enlarged, thereby causing interference with making of a compact electronic equipment and reduction of cost.

SUMMARY OF THE INVENTION

It is an object of the present invention to eliminate the above-mentioned defects, and provide a synchronous separation circuit of a small volume and a low cost, which is stable in quality and wide in use.

Basically, the synchronous separation circuit according to the present invention comprises a capacitor, one end of said capacitor serving as an input terminal for receiving a synthetic video signal, a first C-MOS inverter, an input terminal of said first C-MOS inverter being connected to the other end of said capacitor, a first resistor, one end of said first resistor being connected to the other end of said capacitor, a diode, one end of said diode being connected to the other end of said capacitor, and a second C-MOS inverter, an input terminal of said second C-MOS inverter being connected to the other end of said diode, an output terminal of said second C-MOS inverter being connected directly or through a second resistor to said input terminal of said second C-MOS inverter, wherein when said synthetic video signal has positive characteristics, a potential at the other end of said first resistor is set to a value equal to or lower than a potential at said input terminal of said second C-MOS inverter, and when synthetic video signal has negative characteristics, the potential at the other end of said first resistor is set to a value equal to or higher than the potential at said input terminal of said second C-MOS inverter, so as to provide a direct current bias voltage.

Accorging to the present invention, as a reference voltage for the d.c. bias voltage generated by the second C-MOS inverter is stable, it is possible to reduce a capacitance of the d.c. blocking capacitor for the synthetic video signal, thereby permitting parts to be made compact and cost to be reduced. Further, since such a capacitor of small capacitance as above may be designed in a circuit substrate and a LSI for mounting electronic parts thereon, it is effective for making of a compact electronic equipment and reduction of cost. Further, since even low accuracy of the discharging resistor is satisfactory, it is greatly advantageous for designing the resistor in the LSI, and this contributes to stability of performance of a product. In addition, as an effective range of a power supply voltage is wide, and an input impedance is high, matching of power supply voltages and impedances upon connecting the synchronous circuit with a circuit for outputting a synthetic video signal is less required to be considered.

Furthermore, in the case that a synthetic video signal having negative characteristics is received, as it is only necessary to inverse polarity of the diode without or with slightly changing arrangement of the discharging resistor, it is possible to commonly use parts and provide a synchronous circuit of greatly wide use.

Other objects and advantages of the invention will become apparent from the following description and accompanying drawings.

DETAILED DESCRIPTION OF THE PREFERRED EMBODIMENTS

Figure 1:
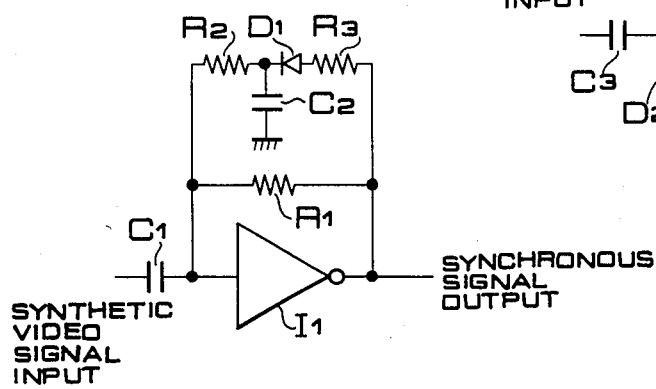
FIG. 1 is a circuit diagram of a conventional synchronous separation circuit.
Figure 3:
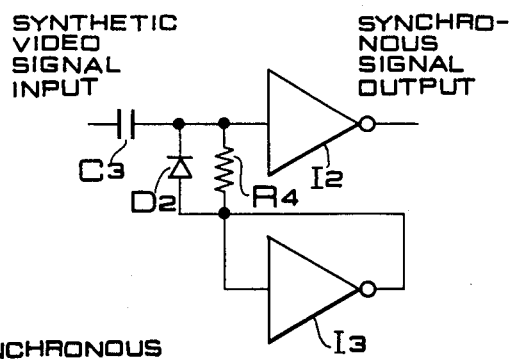
FIG. 3 is a circuit diagram of a first embodiment of the invention.
Figure 2A:
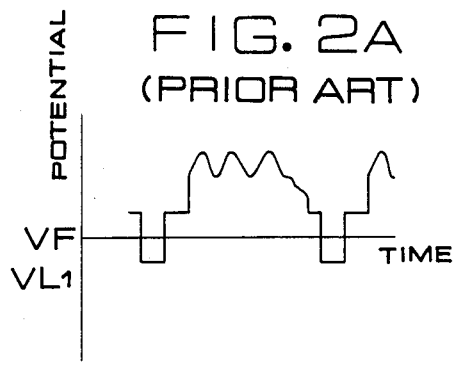
FIG. 2A is a waveform chart at the input terminal of the circuit in FIG. 1.
Figure 4A:
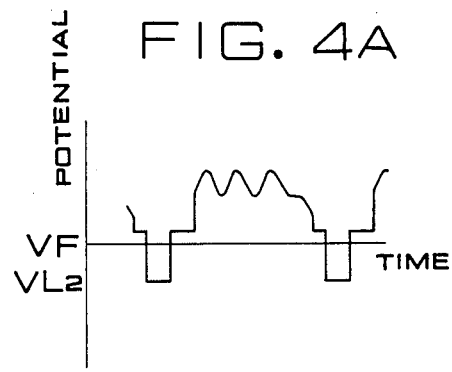
FIG. 4A is a waveform chart at the input terminal of the circuit in FIG. 3.
Figure 2B:
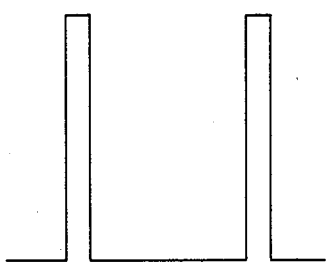
FIG. 2B is a waveform chart of an output in FIG. 2A.
Figure 4B:
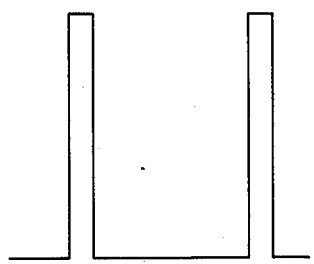
FIG. 4B is a waveform chart of an output in FIG. 4A.

Operation of some preferred embodiments of the present invention will be described below. FIGS. 3 and 4 show a first embodiment of the present invention. Namely, FIG. 3 shows an essential part of the synchronous separation circuit, and FIG. 4A shows a waveform of an input to the first C-MOS inverter upon receiving the synthetic video signal, while FIG. 4B shows a graph of an output from the first C-MOS inverter. In FIG. 3, C3 designates a d.c. blocking capacitor for the synthetic video signal; I2 a first C-MOS inverter for amplifying a synchronous signal in the synthetic video signals; I3 a second C-MOS inverter for generating a change-over voltage of the first C-MOS inverter; R4 a resistor for discharging the capacitor C3; and D2 a diode for fixing a lowermost potential at an input terminal of the first C-MOS inverter I2.

In FIG. 4A, an axis of ordinates shows a potential wherein a reference voltage VF is a change-over potential of the first C-MOS inverter, while an axis of abscissas corresponds to a time. The graph shows a waveform of an input to the first C-MOS inverter I2, that is, a waveform of the sum of the synthetic video signal and a d.c. bias voltage given by the diode D2, resistor R4 and the second C-MOS inverter I3.

FIG. 4B shows a waveform of an output when the synthetic video signal is inputted to the circuit of FIG. 3, wherein an axis of abscissas corresponds to a time, which is in accordance with the axis of abscissas of FIG. 4A. As a potential at the input terminal of the second C-MOS inverter I3 is equal to a potential at the output terminal thereof, the potential is always the changeover potential of the C-MOS inverter. When the first C-MOS inverter I2 receives a synthetic video signal having positive characteristics and a depth of a synchronous signal greater than a voltage drop of the diode D2 through the capacitor C3, the capacitor C3 is charged through the diode D2 to such an extent that the potential at the input terminal of the first C-MOS inverter I2 is lowered from the change-over potential VF of the C-MOS given by the second C-MOS inverter I3 by an amount of the voltage drop of the diode D2, and is fixed to the lowermost potential VL2 of the synchronous signal, which is the minimum portion of the synthetic video signal, as shown in FIG. 4A.

At this time, since a resistance of the resistor R4 is sufficiently greater than a resistance for charging the capacitor C3 by the second C-MOS inverter I3 and the diode D2, the lowermost potential of the input terminal of the first C-MOS inverter, which potential is increased and fixed, is not almost lowered, however, in the event that the capacitor C3 is excessively charged by any factors such as an external noise, a d.c. bias voltage is lowered through the resistor R4. When a waveform of an input to the first C-MOS inverter I2 is given as shown in FIG. 4A, a waveform of an output thereof as shown in FIG. 4B may be finally obtained because of remarkably large amplification factor near the changeover potential of the first C-MOS inverter.

In this connection, as a voltage for the d.c. bias voltage as obtained by the second C-MOS inverter I3 is stable, a capacitance of the capacitor C3 may be small, e.g. 10–10000pF, while as the resistor R4 mainly serves to discharge, a resistance range of the resistor R4 is wide, e.g. 500K–10MΩ. In this embodiment, Si diode is used for the diode D2. As the change-over potential VF of the C-MOS inverter, which is the reference voltage for the d.c. bias voltage, is varied at an output of the second C-MOS inverter in cooperation with a power supply voltage, the power supply voltage widely ranges from 3 to 15 V. An input impedance is almost dependent upon the resistor R4, and is a high value, e.g. 500KΩ or more. Although the above-mentioned description of operation is directed to a case where the circuit receives a synthetic video signal having positive characteristics, in the case that a synthetic video signal having negative characteristics is received, it is only necessary to inverse polarity of the diode D2.

FIGS. 5A to 5D show modified embodiments of the present invention, in which same numerals as in FIG. 3 indicate same parts. In FIGS. 5A to 5D, R5–R7, C4–C5 and D3 designate resistors, capacitors and diode, respectively. Operation of these embodiments will be described below in comparison with that of the first embodiment in FIG. 3. A circuit of FIG. 5A additionally incorporates the resistor R5, so as to fix a potential at an input terminal of the second C-MOS inverter I3 at a high level or low level in checking an IC. According to this embodiment, a current consumption of the second C-MOS inverter may be reduced and it is suitable for measurement of a leakage current.

Figure 5A:
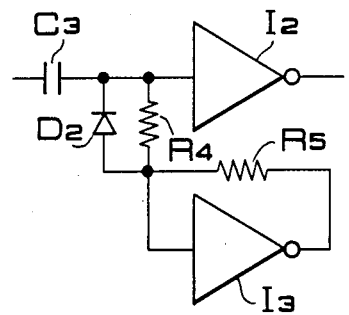
FIGS. 5A to 5D are circuit diagrams of modified embodiments.
Figure 5B:
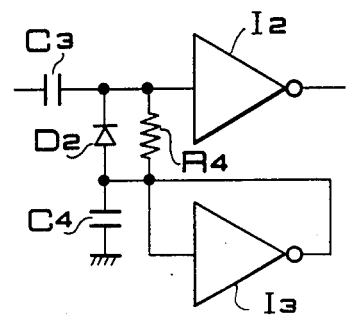

A circuit of FIG. 5B additionally incorporates the capacitor C4, so as to enhance stability of a d.c. bias voltage. According to this embodiment, it is possible to make the second C-MOS inverter compact and reduce a current consumption.

Figure 5C:
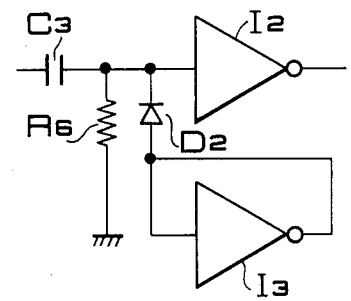

In FIG. 5C, the resistor R6 serves to discharge in the same manner as with the resistor R4 in FIG. 3. When a synthetic video signal having positive characteristics is received, the resistor R6 is connected to a source potential of a N-channel transistor of the C-MOS inverter, while when a synthetic video signal having negative characteristics is received polarity of the diode D2 is inversed and the resistor R6 is connected to a source potential of a P-channel transistor of the C-MOS inverter.

Figure 5D:
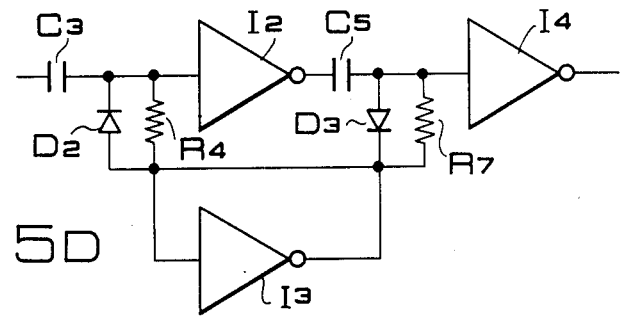

FIG. 5D shows a circuit diagram in the case that amplitude of a video signal having a positive polarity is small. When a video signal having a negative polarity is received, it is only necessary to inverse polarities of the diodes D2 and D3.

Further, although the above-mentioned embodiments are directed to a compact and portable electronic equipment such as a liquid crystal television or the like, the present invention is applicable to a fixed-type electronic equipment such as a television or a microcomputer with a CRT.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A synchronous separation circuit for a television receiver, comprising:
    (a) a first capacitor, one end of which is arranged to receive a synthetic video signal;
    (b) a first C-MOS inverter, an input terminal of which is connected to the other end of said first capacitor and one end of a diode;
    (c) a first resistor, one end of which is connected to said other end of said first capacitor and the other end of which is connected to an input terminal of a second C-MOS inverter; and
    (d) said input terminal of said second C-MOS inverter being connected to the other end of said diode, and an output terminal of said second C-MOS inverter being connected to said input terminal of said second C-MOS inverter.

2. The synchronous separation circuit as claimed in claim 1, wherein the cathode of said diode is connected to said other end of said first capacitor, and a potential equal to or lower than the potential at the input to said second C-MOS inverter is applied to the other end of said first resistor, whereby the synchronous signal can be separated from a synthetic video signal of positive characteristic.

3. The synchronous separation circuit as defined in claim 1, wherein a second capacitor is connected between said diode and a ground.

4. The synchronous separation circuit as claimed in claim 1, wherein an output from said first C-MOS inverter is connected through a second capacitor to an input of a third C-MOS inverter, the input to said third C-MOS inverter further being connected through a further diode and a second resistor to said second C-MOS inverter.

5. The synchronous separation circuit is claimed in claim 1, wherein said output terminal of said second C-MOS inverter is connected to said input terminal thereof via a second resistor.

* * * * *